(12) United States Patent
Swearingen et al.

(10) Patent No.: US 7,606,862 B2
(45) Date of Patent: Oct. 20, 2009

(54) METHOD AND SYSTEM FOR AUTHORIZING A RESTRICTED CALLABLE STATUS IN AN INSTANT MESSAGING SYSTEM

(75) Inventors: Craig Ardner Swearingen, Austin, TX (US); Alan Richard Tannenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 10/815,210

(22) Filed: Mar. 31, 2004

(65) Prior Publication Data

US 2005/0223075 A1 Oct. 6, 2005

(51) Int. Cl.
*G06F 15/16* (2006.01)
*G06F 3/00* (2006.01)

(52) U.S. Cl. .................. 709/206; 709/204; 715/758
(58) Field of Classification Search .......... 709/204, 709/206; 715/758
See application file for complete search history.

(56) References Cited

U.S. PATENT DOCUMENTS

| 5,960,173 A | * | 9/1999 | Tang et al. ............. 709/201 |
| 6,750,881 B1 | * | 6/2004 | Appelman ............. 715/733 |
| 2003/0046296 A1 | | 3/2003 | Doss et al. |

* cited by examiner

*Primary Examiner*—William C Vaughn, Jr.
*Assistant Examiner*—Peling A Shaw
(74) *Attorney, Agent, or Firm*—Yee & Associates, P.C.; Jeffrey S. LaBaw

(57) ABSTRACT

A method, an apparatus, a system, and a computer program product are presented for managing availability status values in an instant messaging application. A user of the instant messaging application is able to select a "do not disturb" status that is to be associated with the user, thereby preventing most users from being able to initiate an instant messaging session with the user. In addition, the user of the instant messaging application can selectively authorize a subset of users to have the privilege of being able to start instant messaging sessions with the user while maintaining an indication to all other users that the user is in a "do not disturb" status.

18 Claims, 4 Drawing Sheets

METHOD AND SYSTEM FOR AUTHORIZING A RESTRICTED CALLABLE STATUS IN AN INSTANT MESSAGING SYSTEM

BACKGROUND OF THE INVENTION

1. Field of the Invention

The present invention relates to an improved data processing system and, in particular, to a method and system for multi-computer data transferring. Still more particularly, the present invention provides a method and system for multi-user communication using instant messaging.

2. Description of Related Art

In most instant messaging systems, the activity status or the availability status of a particular user is reflected to other users of an instant messaging system by associating one of many variable status values with the user account. These status values assist other users in assessing whether it is possible for the other users to initiate an instant messaging session with the given user. For example, an "offline" status shows that a given user is not logged onto the system, thereby informing other users that any attempt to initiate an instant messaging session with the given user would be futile. An "online" status shows that a user is logged onto the system, and other users may assume that they are likely to get a response when they initiate an instant messaging session with the given user.

In some cases, an instant messaging system automatically assigns a certain status value to a user, and this automatic assignment of status can be very helpful in facilitating communication between users. For example, in most instant messaging applications, a user is given the ability to maintain a buddy list; a buddy is another user of the instant messaging application with which the user often exchanges instant messages. The instant messaging system might automatically assign a user an "online" status value when the user logs onto the system; at the same time, a buddy list typically actively displays the status of each buddy. By displaying the buddy list in an open window of a client device, a user has the ability to easily monitor the online status of the user's buddies; when the user notices that a particular buddy's status has changed from "offline" to "online", the user can quickly initiate an instant messaging session with that particular buddy. In some instant messaging systems, an automatic assignment of status is only performed when the user has not previously designated an alternative status; in many cases, the user is able to override an automatically assigned status value by changing it to some other status value.

Although the indication of user status can be helpful in facilitating communication between users, it can also be disruptive to a user's productivity by distracting a user from other activities. Hence, many instant messaging systems allow a user to manually select from several possible status values. In some cases, various privacy-related status values can be selected that control whether other users are informed of a given user's current status. These status values restrict the other users from knowing the true status of the given user, thereby prohibiting those users from beginning an instant message conversation with the given user; for example, an "invisible" status hides a user's status from other users.

In other cases, various privacy-related status values can be selected that inform other users of the likelihood that they will be able to initiate an instant messaging session with a given user. For example, a "busy" status indicates that the given user is currently doing some other activity, while a "be right back" status would indicate to other users that the given user is temporarily away from his or her computer. As another example, a "do not disturb" status would indicate to other users that are interested in the given user's status that the given user does not want to be interrupted by instant messaging sessions. During any period in which the user has one of these status values, though, the user is able to monitor the status of other users or to have the ability to start instant messaging sessions with other users.

As should be apparent from the above-noted exemplary status values, a set of status values can reflect a degree of unavailability of a given user. However, a user may sometimes need a very restrictive, unavailability-related, instant messaging status while desiring some flexibility in its implementation.

Therefore, it would be advantageous for an instant messaging application to provide a flexible, unavailability-related, instant messaging status.

SUMMARY OF THE INVENTION

A method, an apparatus, a system, and a computer program product are presented for managing availability status values in an instant messaging application. A user of the instant messaging application is able to select a "do not disturb" status that is to be associated with the user, thereby preventing most users from being able to initiate an instant messaging session with the user. In addition, the user of the instant messaging application can selectively authorize a subset of users to have the privilege of being able to start instant messaging sessions with the user while maintaining an indication to all other users that the user is in a "do not disturb" status.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
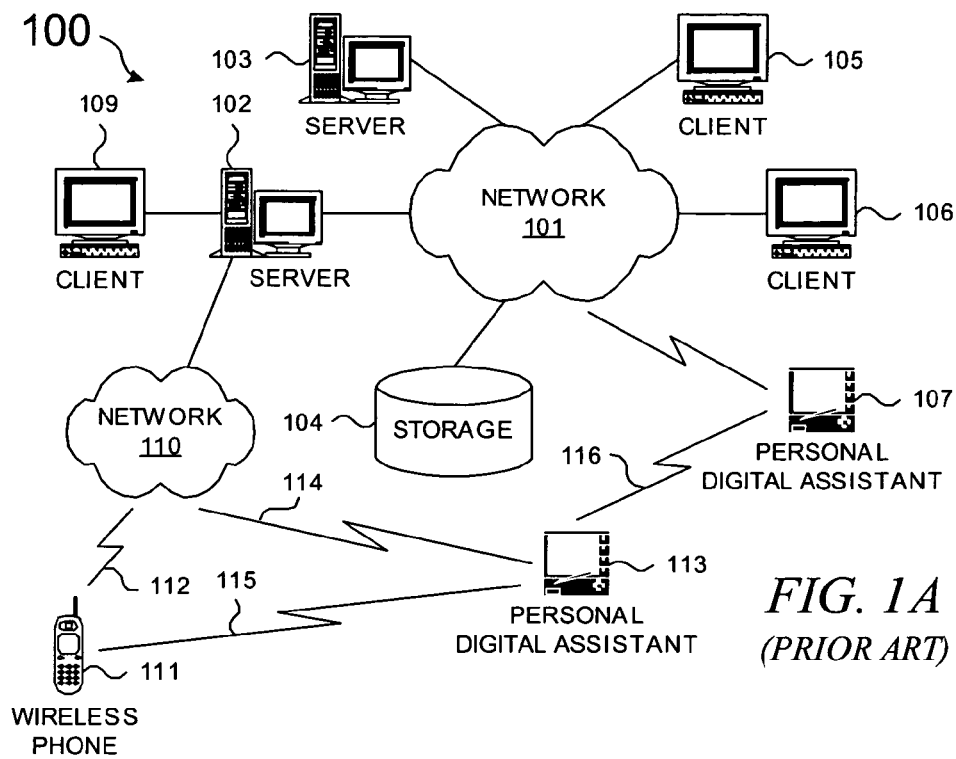
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), Common Presence and Instant Messaging (CPIM) protocols, etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as BluetoothT™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
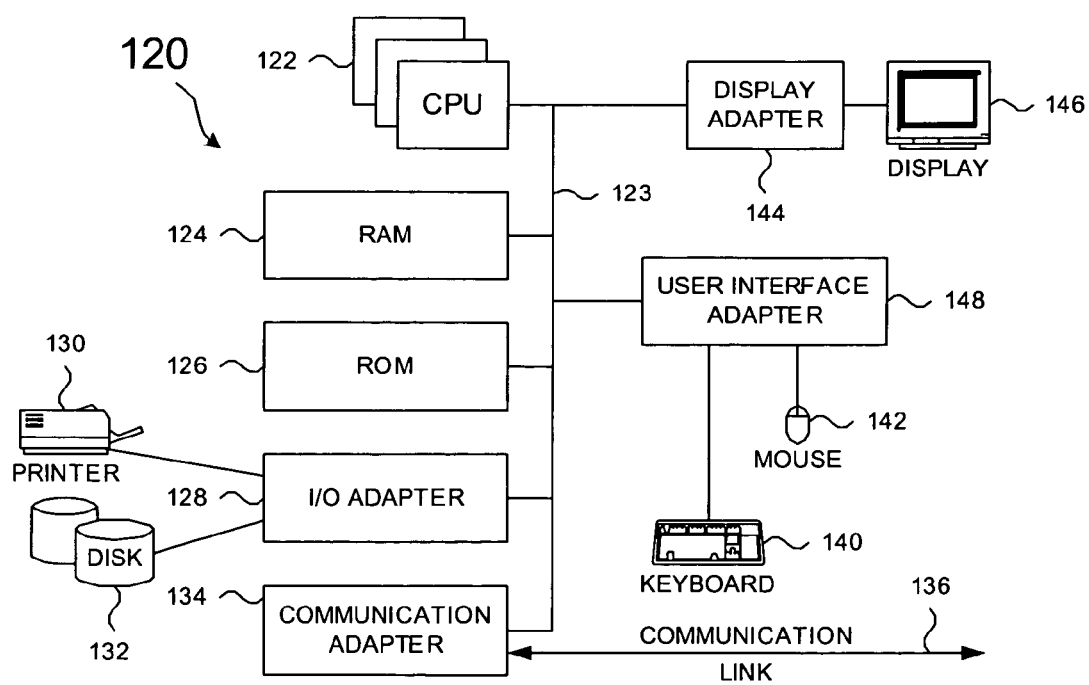
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium® -based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to operating an instant messaging system, as described in more detail below with respect to the remaining figures. It should be noted that the examples that are described hereinbelow often refer to users and systems; it should be understood that a user interacts with a system such that the system performs actions on behalf of a user, and the terms "user" and "system" can sometimes be interchanged in a well-known manner to facilitate the description of operations at a data processing system.

Instant messaging is becoming a common form of communication in personal and business environments. As often occurs with a novel activity, new terminology has been created to assist people in efficiently discussing instant messaging. The act of initiating an instant messaging session with someone has been used as a verb, e.g., "to instant message" someone, or more succinctly, "to IM" someone. Given the difficulty of pronouncing the juxtaposed vowel sounds in "IM", the term "to PM" someone has also become common, meaning "to personal message" someone. In the context of an instant messaging system, though, the act of initiating an instant messaging session with someone has also been termed "to call"someone in a manner similar to using the telephone to establish a communication session with a remote person.

The examples hereinbelow include descriptions of a buddy. A buddy is a remote user of an instant messaging application (client application) with which a user of a local instant messaging application often exchanges instant messages. A buddy is represented by an instant messaging application with an appropriate data entity or data object, herein referred to as a buddy object. A buddy object may comprise many attributes, properties, or other types of information. The buddy object may be presented on a display device in a visual manner by an instant messaging application; the information that is displayed may be a graphical representation of a buddy object, such as a thumbnail picture or an icon, or the information may be in some other form, such as a textual identifier. The description of the invention hereinbelow relies on a well-understanding of the operation of graphical user interfaces in which visual/textual objects on a display device represent a series of abstractions. The user interacts through the graphical user interface to manipulate visually represented data objects, which may represent some other type of data object, such as a buddy object, which itself represents a real user. Hence, the terms "buddy", "buddy object", or some other term for an associated data object can sometimes be interchanged in a well-known manner to facilitate the description of operations at a data processing system.

Figure 2:
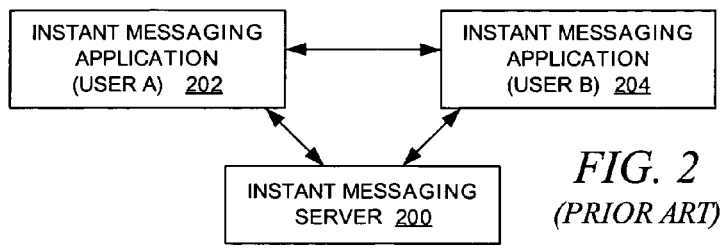
FIG. 2 depicts a block diagram that shows a typical instant messaging system.

With reference now to FIG. 2A, a block diagram depicts a typical instant messaging system. Typical instant messaging systems have characteristics of a client/server organization and a peer-to-peer organization. Instant messaging (IM) server 200 authenticates a user of an instant messaging application, such as instant message application instances 202 and 204. After authenticating a user, the instant messaging server will perform certain operations on behalf of the instant messaging application. In this manner, an instance of an instant messaging application operates as an instant messaging client. The instant messaging server maintains some type of session for each active instant messaging client, which eventually logs out from the session or allows the session to undergo a timeout termination.

However, after being initialized with certain information, depending on the communication protocol, active instant messaging clients can communicate directly with each other by transferring instant messages directly to another active instant messaging client without assistance from the instant messaging server. In this manner, the separate instances of the instant messaging application act as peer nodes in a peer-to-peer network. Many instant messaging systems employ proprietary protocols, although standard instant messaging protocols have been proposed, e.g., Crocker et al., "Common Presence and Instant Messaging (CPIM)", Internet Draft of the Internet Engineering Task Force (IETF), draft-ietf-impp-cpim-03.txt, 08/2002. The exemplary embodiments of the present invention that are described hereinbelow are intended to operate with proprietary or non-proprietary protocols regardless of the instant messaging system or framework.

For example, assuming that a user has previously registered for an account with the instant messaging server, a user logs into the instant messaging server through an instant messaging application on a client device. The instant messaging server stores the connection information for the client device, such as the IP address of the client device and the port number that is assigned to the instant messaging application at the client device.

During the login operation, the instant messaging server also receives and stores an IM contact list, often referred to as a buddy list, for the user along with the user's connection information and other session information. The server performs an initial check to obtain the status of the users in the buddy list and notifies the user's active instant messaging client of the status of those users, e.g., whether those users are online and available for communication through the instant messaging system. The server monitors these buddy lists such that when a user logs into the instant messaging system, the server notifies anyone who has the recently logged-in user within a buddy list that the recently logged-in user is now online or is associated with some other type of status.

Assuming that a buddy has not chosen to remain cloaked within an "invisible" status, when the instant messaging server notifies a first instant messaging client that a second instant messaging client is online, the instant messaging server sends the connection information for the second instant messaging client to the first instant messaging client and perhaps vice versa depending upon the online status of the user. Because each active instant messaging client has connection information for other active instant messaging clients in the instant messaging system, these instant messaging clients can transfer instant messages between themselves without interaction with the instant messaging server, i.e. in a peer-to-peer manner.

Figure 3:
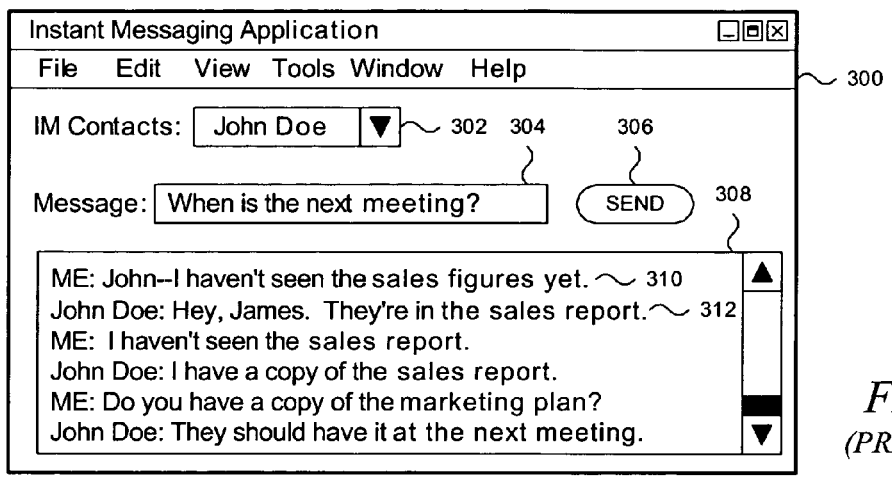
FIG. 3 depicts a diagram that shows a typical graphical user interface window for an instant messaging application that shows the text of an instant messaging session.

With reference now to FIG. 3, a diagram depicts a typical graphical user interface window for an instant messaging application that shows the text of an instant messaging session. Text strings and file attachments for the instant messages of an instant messaging session are presented to a user of an active instant messaging client in a GUI window. Window 300 is presented on a display device connected to a data processing system on which an instance of an instant messaging application is executing for a user. In a typical fashion for an instant messaging application, window 300 contains several user interface controls for operating the instant messaging application. Drop-down menu 302 contains the user's contact list. Text entry field 304 allows entry of a text string to be sent as an instant message. "SEND" button 306 initiates a transmit operation to generate and send the contents of the text entry to the selected instant message contact.

A history of the instant messages within an instant messaging conversation is typically shown within a scrolling window; it is expected that both users of the instant messaging session will view the same content within their respective GUI windows during an instant messaging conversation. Scrollable text area 308 contains the history of the instant messaging conversation. Text line 310 is the initial instant message that was sent by a local user to the remote user; text line 312 is the response from the remote user, and the remaining text lines in text area 308 reflect instant messages for the continuing conversation. The instant messaging application may separately maintain different conversations in different windows during a user's instant messaging session, which may run for an extended period of time, e.g., during business hours within a corporate context.

Figure 4:
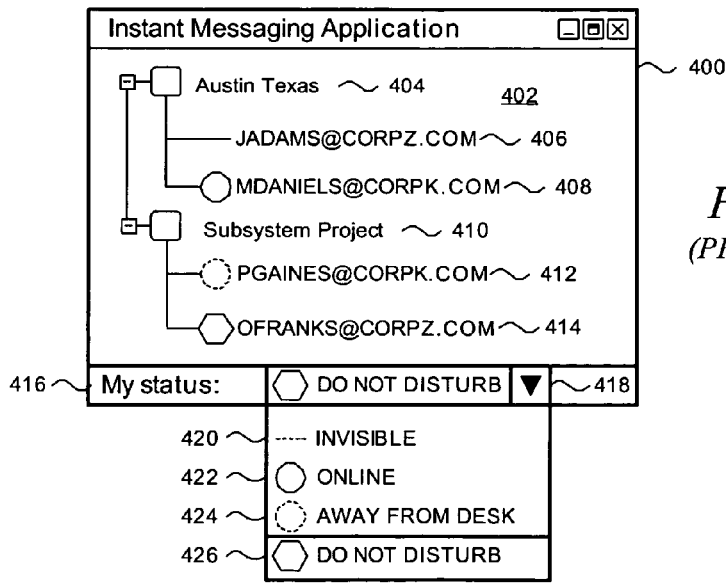
FIG. 4 depicts a diagram that shows a typical graphical user interface window for an instant messaging application that shows an IM contact list or buddy list.

With reference now to FIG. 4, a diagram depicts a typical graphical user interface window for an instant messaging application that shows an IM contact list or buddy list. For a given user of an instant messaging application or system, a buddy is a remote user of the instant messaging system with whom the given user exchanges instant messages. Most instant messaging applications provide a mechanism for organizing information about a list of buddies. Window 400 is a typical GUI window for a buddy list within an instant messaging application. Buddy list area 402 shows multiple buddies in a buddy list, and the buddy list is organized in a hierarchical fashion with buddies possibly included within a group of buddies, such as group 404 or group 406.

The instant messaging application or system monitors these buddy lists such that when a user logs into the instant messaging system, the server notifies anyone who has the recently logged-in user within a buddy list that the recently logged-in user is now online or is associated with some other type of status. In this manner, assuming that a buddy has not chosen to remain cloaked within an "invisible" status, instant messaging users are constantly aware of the status of the users within their buddy lists because an instant messaging client is updated relatively quickly with the appropriate information. The instant messaging client typically provides visual indicators in a buddy list window that indicate the status of a buddy. Each buddy object in the buddy list has an associated status indicator. By glancing at a visual representation of a buddy object, a user can quickly determine which type of status is associated with the buddy represented by the buddy object. For example, buddy 408 does not have an associated status indicator icon, thereby indicating that the buddy probably has an "offline" status, although the user may be hiding under an "invisible" status or some other status even though the user is actually logged onto the instant messaging system. In addition, buddy 410 has an "online" status, buddy 412 has an "away from desk" status; and buddy 414 has a "do not disturb" status.

Status bar 416 indicates the current instant messaging status of the user of the instant messaging application. In the example that is shown in FIG. 4, the user has a "do not disturb" status; hence, if the user is included as a buddy in other users' buddy lists, the status of the user would appear in a manner similar to that shown for the user's buddy 414. The user's status is displayed in conjunction with a drop-down menu 418 that contains selectable instant messaging status values, thereby allowing the user to change the user's instant messaging status as desired. If the user selects a menu item within drop-down menu 418, then the selected status is transmitted to anyone who has included the user within a buddy list.

As noted previously, the indication of a user's instant messaging status can be helpful in facilitating communication between users, but it can also be disruptive to a user's productivity by distracting a user from other activities. Hence, many instant messaging systems allow a user to manually select from several privacy-related status values that control whether other users are informed of a given user's current status. These status values restrict the other users from knowing the true status of the given user, thereby prohibiting those users from beginning an instant message conversation with the given user. In the example that is shown in FIG. 4, menu item 420 allows a user to select an "invisible" status that hides a user's status from other users; if a user selects menu item 420, then the user would continue to appear in other users' buddy lists with an "offline" status in a manner similar to buddy 408 in the user's buddy list 402, even after the user has actually logged onto the instant messaging system. If the user later desires to appear as available for chatting with other users, then the user can select menu item 422, which allows a user to select an "online" status.

As another example of a restrictive status, menu item 424 allows a user to select an "away from desk" status that informs other users that the user would probably not respond to an instant messaging session because the user is supposed to be elsewhere; if a user selects menu item 424, then the user would appear in other users' buddy lists with the status indicator icon that is shown in menu item 424. As yet another example of a restrictive status, menu item 426 allows a user to select a "do not disturb" status that informs other users that they cannot initiate an instant messaging session with the user; if a user selects menu item 426, then the user would appear in other users' buddy lists with the status indicator icon that is shown in menu item 426.

Given the background information that has been provided above with respect to prior art instant messaging systems, the description turns now to the present invention, which recognizes a problem in the operation of prior art instant messaging systems. The present invention recognizes that a user may sometimes need a very restrictive, unavailability-related, instant messaging status, such as a "do not disturb" status, while desiring some flexibility in its implementation. In particular, there may be situations in which a given user wants to use show a "do not disturb" status to most users yet also wants to allow a subset of users to be able to start an instant messaging session with the given user. For example, a given user who is attending an out-of-office conference might choose a special instant messaging status with these characteristics such that conference attendees are designated as a special subset of users; this subset of users would be allowed to initiate instant message sessions with the given user while other users would not be able to initiate instant message sessions with the given user. As another example, a busy executive may desire to set a "do not disturb" status for most employees while allowing only immediately subordinate staff members to start instant messaging conversations. The present invention accommodates these needs as described in more detail below with respect to the remaining figures.

Figure 5:
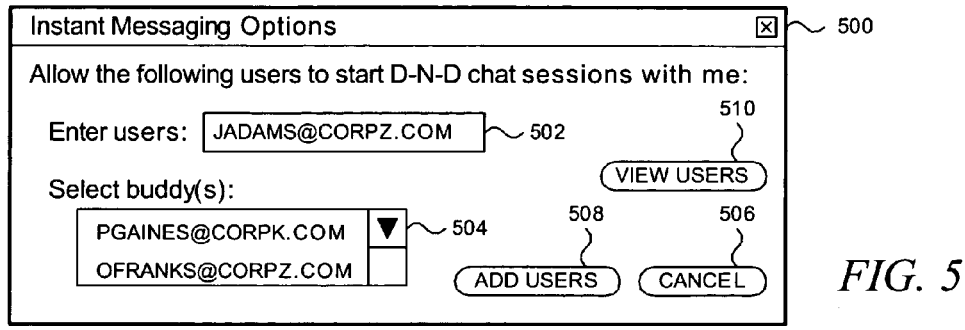
FIG. 5 depicts a graphical user interface window for an instant messaging application that allows a user of the instant messaging application to enter or select other users that will be allowed to start chat sessions with the user even though the user is associated with a "do not disturb" status.

With reference now to FIG. 5, a diagram depicts a graphical user interface window for an instant messaging application that allows a user of the instant messaging application to enter or select other users that will be allowed to start chat sessions with the user even though the user is associated with a "do not disturb" status. As noted above, a user may sometimes desire that the user's instant messaging status is indicated as a "do not disturb" status for most users while allowing a subset of users to start chat sessions with the user, i.e. to allow other users to initiate an instant messaging session with the user or otherwise to call the user within an instant messaging context while the user is associated with a "do not disturb" status. Window 500 is a GUI window within an instant messaging client application that allows a user to designate which users have the authorization or privilege to override a restrictive instant messaging status that is associated with the user, such as a "do not disturb" status, in order to call the user to start an instant message session.

Window 500 may be presented after the user has selected a menu within the main application window of the instant messaging client application or has otherwise issued a command within the instant messaging application to request the option to set a restricted yet callable privilege for a subset of users. Text entry field 502 allows a user to enter some form of identifier for another user that will be included in the special subset of users; the user may have the option to enter multiple user identifiers that are separated by a delimiter, such as a comma. Scrollable list 504 allows a user to select previously designated user identifiers from the user's buddy lists such that the selected users are included in the special subset of users. "Cancel" button 506 closes window 500 without performing any modifications to the list of users in the special subset of users. "Add users" button 508 adds the entered users or the selected users to the list of users in the subset of users. "View users" button 510 allows the user to see which users are already included in the list of users, which would have been stored in persistent storage within the instant messaging system; this option may further allow the user to delete or edit the list of users that are already included in the list of users.

Figure 6A:
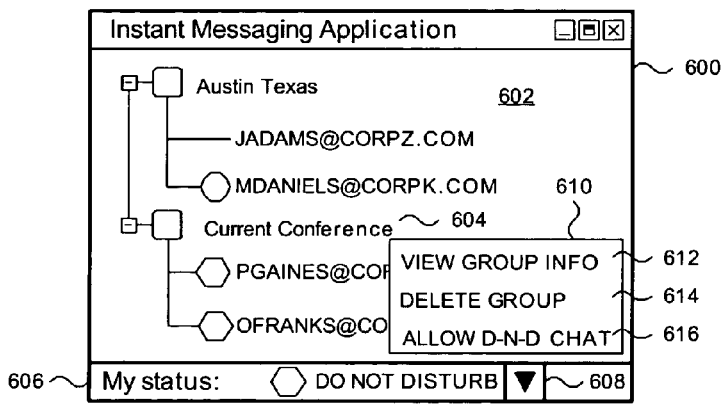
FIG. 6A depicts a graphical user interface window for an instant messaging application that shows an IM contact list or buddy list with a floating option menu that allows a user of the instant messaging application to select a group of users that will be allowed to start chat sessions with the user even though the user is associated with a "do not disturb" status.

With reference now to FIG. 6A, a diagram depicts a graphical user interface window for an instant messaging application that shows an IM contact list or buddy list with a floating option menu that allows a user of the instant messaging application to select a group of users that will be allowed to start chat sessions with the user even though the user is associated with a "do not disturb" status. Window 600 is a GUI window for a buddy list within an instant messaging application that is similar to window 400 that is shown in FIG. 4. Buddy list area 602 shows multiple buddies in a buddy list, and the buddy list is organized in a hierarchical fashion with buddies included within a group of buddies, such as group 604. Status bar 606 indicates the current instant messaging status of the user of the instant messaging application; in the example that is shown in FIG. 6A, the user has a "do not disturb" status. The user's status is displayed in conjunction with a drop-down menu 608 that contains selectable instant messaging status values, thereby allowing the user to change the user's instant messaging status as desired.

In the example that is shown in FIG. 6A, the user has previously performed an alternate selection operation; if the user is operating a mouse as an input device, the user may have performed an alternate mouse button selection, sometimes referred to as a "right mouse button click". As is typical in many applications, the instant messaging application has displayed a menu of optional operations that may be performed on the selected data item, compared with a normal mouse button click operation or a "left mouse button click" that might have resulted in a normal selection operation. Although not shown in FIG. 4, if the user had performed the alternate selection operation within window 400, the instant messaging application may have displayed "View Group Info" option 612 and "Delete Group" option 614, thereby allowing the user to perform the displayed actions on the selected buddy list.

In contrast to a typical instant messaging application, the present invention extends an instant messaging application to provide the user with "Allow D-N-D Chat" option 616, i.e. allow chat sessions during do-not-disturb status. Rather than entering or selecting a subset of users as shown in FIG. 5, option 616 in FIG. 6A allows the user to select a subset of users that has been previously grouped together, and this subset of users will have the privilege of starting chat sessions with the user even though the user is associated with a "do not disturb" status. Alternatively, a similar optional selection operation may be performed on individual users within window 600 so that a user may perform a GUI operation with respect to individual users.

Figure 6B:
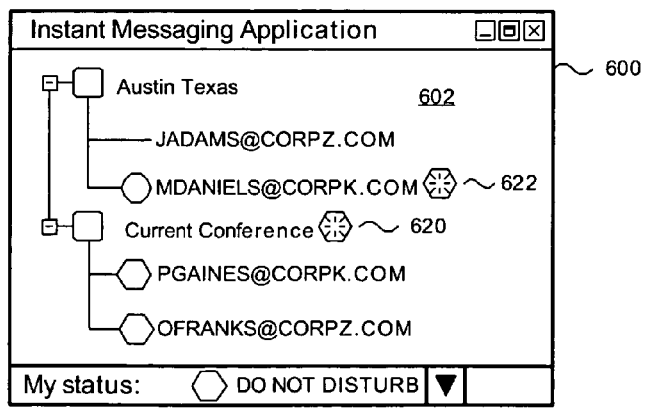
FIG. 6B depicts a graphical user interface window for an instant messaging application that shows an IM contact list or buddy list after a user of the instant messaging application has selected a group of users that will be allowed to start chat sessions with the user even though the user is associated with a "do not disturb" status.

With reference now to FIG. 6B, a diagram depicts a graphical user interface window for an instant messaging application that shows an IM contact list or buddy list after a user of the instant messaging application has selected a group of users that will be allowed to start chat sessions with the user even though the user is associated with a "do not disturb" status. FIG. 6B is similar to FIG. 6A; similar reference numerals refer to similar elements in the figures. In contrast to FIG. 6A, window 600 in FIG. 6B displays special icon 620 that is associated with group 604 and special icon 622 that is associated with a buddy in the user's buddy list. Special icons 620 and 622 indicate that the user has previously authorized group 604 or the associated buddy, respectively, to have the privilege of being able to initiate an instant messaging session with the user while the user has a "do not disturb" status. In addition, the present invention may be implemented such that a special icon is presented to those users that are in the user's privileged subset of users; in those users' buddy lists, rather than appearing with a typical "do not disturb" icon, the user's identifier would appear in association with a special icon, thereby providing an indication to those users that they may initiate an instant messaging session with the user even though the user is in a "do not disturb" status.

Figure 7:
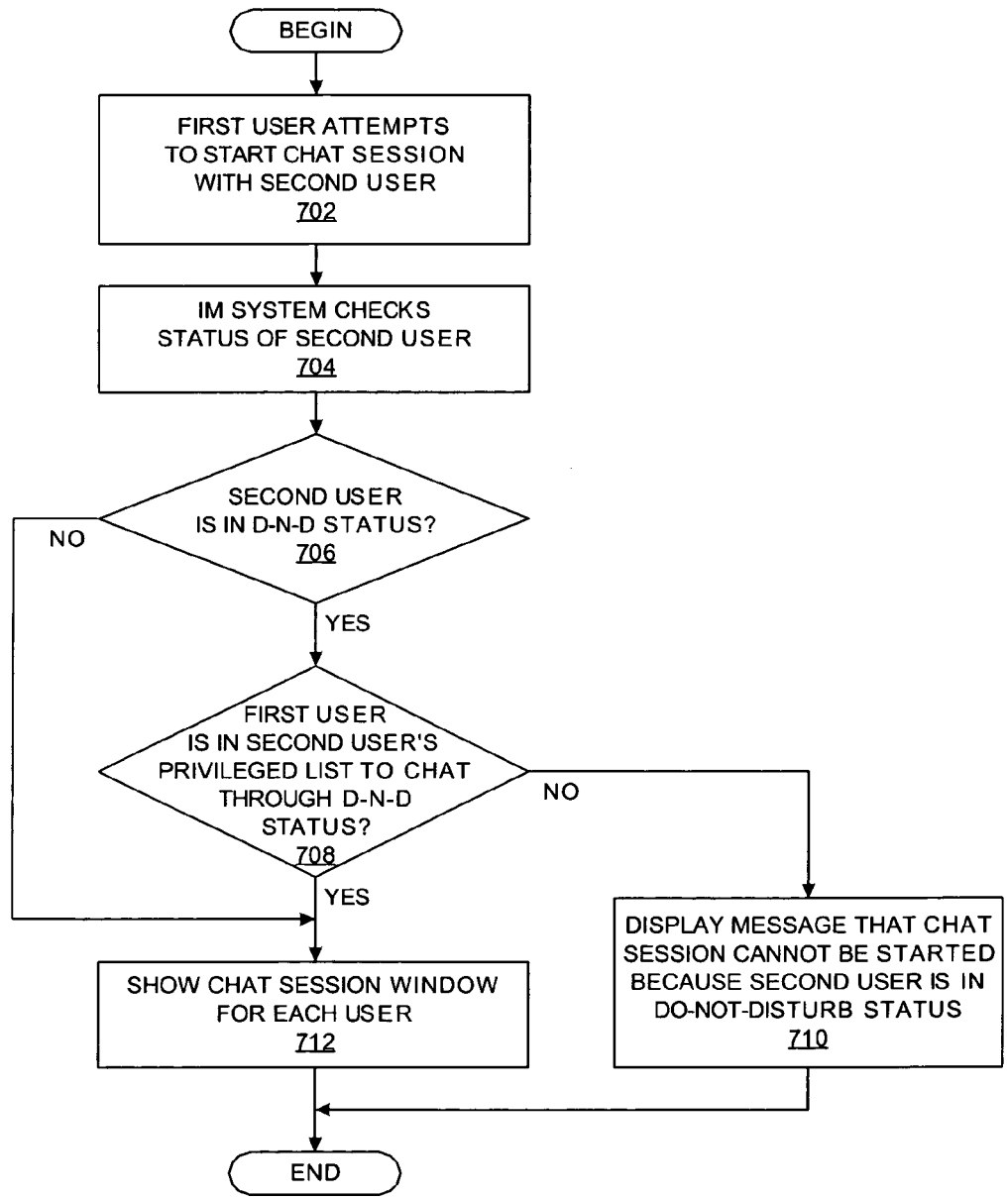
FIG. 7 depicts a flowchart that shows a process by which users of an instant messaging application can converse in an instant messaging session while maintaining a restricted, callable status on at least one of the users.

With reference now to FIG. 7, a flowchart depicts a process by which users of an instant messaging application can converse in an instant messaging session while maintaining a restricted, callable status on at least one of the users. As described above with respect to FIGS. 5-6B, a user of an instant messaging application can enter or select other users that will be allowed to start chat sessions with the user even though the user is associated with a "do not disturb" status, thereby associating a callable privilege with a subset of instant messaging users, i.e. an allow list of users, that can pierce the veil of an otherwise highly restricted availability status. The process that is depicted in the flowchart in FIG. 7 shows the manner in which the previously determined list of privileged users is employed.

The process commences with a first user attempting to start a new chat or instant messaging session with a second user (step 702). The instant messaging system, e.g., an instant messaging server or one of the instant messaging client applications, checks the status of the second user (step 704), and a determination is made as to whether or not the second user is associated with a "do not disturb" status (step 706). If yes, then a determination is made as to whether or not the first user is in the second user's privileged list of users that are allowed to initiate an instant messaging session with the second user even though the second user is currently in a "do not disturb" status (step 708). If not, then the instant messaging system displays a message to the first user that the chat session cannot be started because the second user is in a "do not disturb" state (step 710), and the process is concluded.

If the first user is in the second user's privileged list of users that are allowed to initiate an instant messaging session with the second user even though the second user is currently in a "do not disturb" status, the instant messaging system displays chat session windows for the first user and the second user to start the chat session (step 712), thereby concluding the process. Returning to the negative conclusion of step 706, if the second user is not in a "do not disturb" status, then the process also branches to step 712, which assumes that there are no additional, highly restricted, instant messaging status values other than the "do not disturb" status that would preclude the initiation of a chat session.

The advantages of the present invention should be apparent in view of the detailed description that is provided above. Busy users that generally do not want to be disturbed by instant messaging sessions can selectively authorize a subset of users to have the privilege of being able to start chat sessions with the user while indicating to all other users that the user is in a "do not disturb" status.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer implemented method for managing user status values in an instant messaging system, wherein the user status values indicate an availability to participate in an instant messaging session, the computer implemented method comprising:

receiving a first request from a second user to designate a do not disturb status that is associated with the second user such that a group of first users cannot initiate a new instant messaging session with the second user, wherein the group of first users comprises a buddy list of the second user;

receiving a second request from the second user to designate a subset of the group of first users such that the subset of the group of first users is authorized to initiate the new instant messaging session with the second user while a remainder of the group of first users cannot initiate the new instant messaging session with the second user;

the second user receiving a request from a first user of the group of first users to initiate the new instant messaging session with the second user;

determining whether the second user has designated the do not disturb status;

in response to determining that the second user has designated the do not disturb status, determining whether the first user of the group of first users is included in the subset of the group of first users;

in response to determining that the first user is not included in the subset of the group of first users, denying the request from the first user to initiate the new instant messaging session with the second user, and displaying a message to the first user that the new instant messaging session cannot be initiated; and in response to determining that the first user is included in the subset of the group of first users, displaying chat session windows for the first user and the second user for initiating the new instant messaging session with the second user.

2. A computer program product in a computer readable storage medium having computer usable program code for managing user status values in an instant messaging system, wherein the user status values indicate an availability to participate in an instant messaging session, the computer program product comprising:

means for receiving a first request from a second user to designate a do not disturb status that is associated with the second user such that a group of first users cannot initiate a new instant messaging session with the second user, wherein the group of first users comprises a buddy list of the second user;

means for receiving a second request from the second user to designate a subset of the group of first users such that the subset of the group of first users is authorized to initiate the new instant messaging session with the second user while a remainder of the group of first users cannot initiate the new instant messaging session with the second user;

means for the second user to receive a request from a first user of the group of first users to initiate the new instant messaging session with the second user; means for determining whether the second user has designated the do not disturb status;

means for determining whether the second user has designated the do not disturb status;

in response to determining that the second user has designated the do not disturb status, means for determining whether the first user of the group of first users is included in the subset of the group of first users;

in response to a determining that the first user is not included in the subset of the group of first users, means for denying the request from the first user to initiate the new instant messaging session with the second user, and displaying a message to the first user that the new instant messaging session cannot be initiated; and in response to a determining that the first user is included in the subset of the group of first users, means for displaying chat session windows for the first user and the second user for initiating the new instant messaging session with the second user.

3. A data processing system for managing user status values in an instant messaging system, wherein the user status values indicate an availability to participate in an instant messaging session, the data processing system comprising:

a bus system;

a storage device connected to the bus system, wherein the storage device includes a set of instructions; and a processing unit connected to the bus system, wherein the processing unit executes the set of instructions to receive a first request from a second user to designate a do not disturb status that is associated with the second user such that a group of first users cannot initiate a new instant messaging session with the second user, wherein the group of first users comprises a buddy list of the second user; receive a second request from the second user to designate a subset of the group of first users such that the subset of the group of first users is authorized to initiate the new instant messaging session with the second user while a remainder of the group of first users cannot initiate the new instant messaging session with the second user; receive, by the second user, a request from a first user of the group of first users to initiate the new instant messaging session with the second user; determine whether the second user has designated the do not disturb status; in response to determining that the second user has designated the do not disturb status, determine whether the first user of the group of first users is included in the subset of the group of first users; in response to determining that the first user is not included in the subset of the group of first users, deny the request from the first user to initiate the new instant messaging session with the second user, and display a message to the first user that the new instant messaging session cannot be initiated; and in response to determining that the first user is included in the subset of the group of first users, display chat session windows for the first user and the second user for initiating the new instant messaging session with the second user.

4. A computer implemented method for managing user status values in an instant messaging system, wherein the user status values indicate an availability to participate in an instant messaging session, the computer implemented method comprising:

receiving a first request from a second user to designate a do not disturb status that is associated with the second user such that a group of first users cannot initiate a new instant messaging session with the second user;

receiving a second request from the second user to designate a set of first users of the group of first users such that the set of first users is authorized to initiate the new instant messaging session with the second user while a remainder of the group of first users cannot initiate the new instant messaging session with the second user;

the second user receiving a request from a first user to initiate the new instant messaging session with the second user;

determining whether the second user has designated the do not disturb status;

in response to determining that the second user has designated the do not disturb status, determining whether the first user is included in the set of first users;

in response to determining that the first user is not included in the set of first users, denying the request from the first user to initiate the new instant messaging session with the second user; and in response to determining that the first user is included in the set of first users, displaying a chat session window for the second user for initiating the new instant messaging session with the second user.

5. The computer implemented method of claim 4, wherein the group of first users comprises all users except the second user.

6. The computer implemented method of claim 4, further comprising: the second user selecting the group of first users.

7. The computer implemented method of claim 6, wherein the group of first users comprises a buddy list of the second user.

8. The computer implemented method of claim 4, wherein the set of first users comprises a plurality of first users.

9. A computer program product in a computer readable storage medium having computer usable program code for managing user status values in an instant messaging system, wherein the user status values indicate an availability to participate in an instant messaging session, the computer program product comprising:

instructions for receiving a first request from a second user to designate a do not disturb status that is associated with the second user such that a group of first users cannot initiate a new instant messaging session with the second user;

instructions for receiving a second request from the second user to designate a set of first users of the group of first users such that the set of first users is authorized to initiate the new instant messaging session with the second user while a remainder of the group of first users cannot initiate the new instant messaging session with the second user;

instructions for the second user to receive a request from a first user to initiate the new instant messaging session with the second user;

instructions for determining whether the second user has designated the do not disturb status;

in response to determining that the second user has designated the do not disturb status, instructions for determining whether the first user is included in the set of first users;

in response to determining that the first user is not included in the set of first users, instructions for denying the request from the first user to initiate the new instant messaging session with the second user; and in response to determining that the first user is included in the set of first users, instructions for displaying a chat session window for the second user for initiating the new instant messaging session with the second user.

10. The computer program product of claim 9, wherein the group of first users comprises all users except the second user.

11. The computer program product of claim 9, further comprising: instructions for the second user to select the group of first users.

12. The computer program product of claim 11, wherein the group of first users comprises a buddy list of the second user.

13. The computer program product of claim 9, wherein the set of first users comprises a plurality of first users.

14. A data processing system for managing user status values in an instant messaging system, wherein the user status values indicate an availability to participate in an instant messaging session, the data processing system comprising:

a bus system;

a storage device connected to the bus system, wherein the storage device includes a set of instructions; and a processing unit connected to the bus system, wherein the processing unit executes the set of instructions to receive a first request from a second user to designate a do not disturb status that is associated with the second user such that a group of first users cannot initiate a new instant messaging session with the second user; receive a second request from the second user to designate a set of first users of the group of first users such that the set of first users is authorized to initiate the new instant messaging session with the second user while a remainder of the group of first users cannot initiate the new instant messaging session with the second user; receive, by the second user, a request from a first user to initiate the new instant messaging session with the second user; determine whether the second user has designated the do not disturb status; in response to determining that the second user has designated the do not disturb status, determine whether the first user is included in the set of first users; in response to determining that the first user is not included in the set of first users, deny the request from the first user to initiate the new instant messaging session with the second user; and in response to determining that the first user is included in the set of first users, display a chat session window for the second user for initiating the new instant messaging session with the second user.

15. The data processing system of claim 14, wherein the group of first users comprises all users except the second user.

16. The data processing system of claim 14, and further comprising wherein the processing unit executes the set of instructions for the second user to select the group of first users.

17. The data processing system of claim 16, wherein the group of first users comprises a buddy list of the second user.

18. The data processing system of claim 14, wherein the set of first users comprises a plurality of first users.

* * * * *

UNITED STATES PATENT AND TRADEMARK OFFICE
CERTIFICATE OF CORRECTION

PATENT NO. : 7,606,862 B2 Page 1 of 1
APPLICATION NO. : 10/815210
DATED : October 20, 2009
INVENTOR(S) : Swearingen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1377 days.

Signed and Sealed this

Twelfth Day of October, 2010

David J. Kappos
*Director of the United States Patent and Trademark Office*